United States Patent [19]
Chittolini

[11] Patent Number: 5,910,515
[45] Date of Patent: Jun. 8, 1999

[54] POLYURETHANE FOAM

[75] Inventor: Claudio Chittolini, Reggio Emilia, Italy

[73] Assignee: EDILTEC S.r.L., Modena, Italy

[21] Appl. No.: 09/159,779

[22] Filed: Sep. 24, 1998

Related U.S. Application Data

[62] Division of application No. 08/826,756, Mar. 24, 1997, Pat. No. 5,859,078.

[51] Int. Cl.⁶ .............................. C08G 18/30; C08G 18/34
[52] U.S. Cl. ........................ 521/109.1; 521/128; 521/132
[58] Field of Search ................................ 521/109.1, 128, 521/132

[56] References Cited

U.S. PATENT DOCUMENTS

| | | |
|---|---|---|
| 4,246,364 | 1/1981 | Koehler et al. . |
| 5,300,531 | 4/1994 | Weaver . |
| 5,389,696 | 2/1995 | Dempsey et al. . |

FOREIGN PATENT DOCUMENTS

| | | |
|---|---|---|
| 1 588 353 | 4/1970 | France . |
| 43 39 702 | 5/1995 | Germany . |
| 96/12759 | 5/1996 | WIPO . |
| 96/33230 | 10/1996 | WIPO . |

*Primary Examiner*—Morton Foelak
*Attorney, Agent, or Firm*—Finnegan, Henderson, Farabow, Garrett & Dunner, L.L.P.

[57] ABSTRACT

A polyurethane or polyisocyanurate foam is derived from a mixture comprising a crude isocyanate component and a polyol component which contains all or some of the following products in a homogeneous mixture: polyols, catalysts, surfactants, water, flame-retardants, expanding agents, fillers, dyes and pigments, in which the expanding agents comprise a pentane component associated with a dialkanolamide derived from fatty or oily substances of vegetable origin.

12 Claims, No Drawings

POLYURETHANE FOAM

This is a division of application Ser. No. 08/826,756, filed Mar. 24, 1997, now U.S. Pat. No. 5,859,078 which is incorporated herein by reference.

TECHNICAL FIELD

The present invention relates to a polyurethane or polyisocyanurate foam derived from a mixture comprising a crude isocyanate component and a polyol component, which contains i.a. an expanding agent consisting of a pentane and a compatibilizing agent.

BACKGROUND OF THE INVENTION

Polyurethane is well known as a base product for the manufacture of rigid foams which are used widely as insulators in refrigerators and freezers, in insulating panels for buildings, and for the refrigeration industry, in sheets for insulating transportation means, tanks, pipes, and even for the production of high-density rigid foams for furniture or for technical products in general.

Polyurethane is also well known as a base product for the manufacture of flexible or semiflexible foams which are used widely as cushions and mattresses in the furnishing industry, and as padding in seats, arm-rest, bumpers etc. in the car industry, where it is often used with the RIM-RRIM technology.

Polyurethane foam is produced by the intimate mixing and reaction of two liquid products, an isocyanate component, usually crude MDI, and a polyol component which contains all or some of the following products in a homogeneous mixture:

polyols—reactive products of suitable molecular weight for reacting with the isocyanate to form a rigid, flexible or semiflexible product:

catalysts—generally tertiary amines or potassium, tin or lead salts, which regulate the reaction rate;

surfactants—which affect the surface tension and regulate the formation of the foam;

water which reacts with the isocyanate to produce carbon dioxide which acts as an expander;

flame-retardants which regulate the behaviour of the foam with respect to fire;

expanding agents, that is, low-boiling products which regulate the expansion of the foam;

various additives such as fillers, dyes and pigments for various applications.

The polyol component and the isocyanate component are thermostatically controlled, metered, mixed and poured by means of suitable machines.

Various formulations of the polyol component are used to produce different types of rigid, flexible or semiflexible foams by various processes, some of which are described by way of example below.

Continuous and Discontinuous Production of Rigid or Flexible Foam Blocks continuous: the reactive polyurethane mixture is cast onto a conveyor belt, is restrained laterally, and is allowed to expand freely until the product has hardened; after curing, the product is trimmed and cut into sheets;

discontinuous: the reactive mixture is poured into container tanks and is left to expand freely until a hard block of foam is formed; after curing it is trimmed and cut into sheets.

Continuous or Discontinuous Production of Rigid Roam Panels continuous: the reactive mixture is cast onto various paper, metal or glass-cloth coverings where it expands to fit the coverings, forming a covered rigid foam panel; the panel is then trimmed and cut to size;

discontinuous: the reactive mixture is cast into moulds or presses in which the coverings are positioned and is left to expand until it fills them completely, adhering to the coverings and thus creating covered panels.

Production of Refrigerators, Refrigerated Counters, Freezers

The reactive mixture is injected into moulds (forms) in which the refrigerator to be insulated is positioned. The expansion of the product insulates the structure of the refrigerator.

Production of Poured and/or Sprayed Rigid Foam

The reactive mixture can be sprayed or cast directly into the cavity to be insulated by means of suitable machines, creating an insulating filling or layer.

Production of High-Density Rigid Foams with Integral Skins (Simulated Wood)

High-density foams of 200–600 kg/cu.m. similar to wood are produced and are used mainly in the furniture industry, the reactive mixture being cast in moulds where it expands to fit the design of the mould.

Production of Flexible or Semi-Flexible Cold Moulded Foam

Low density flexible foam of 30–200 $Kg/m^3$ and high density semiflexible foam of 200–600 $Kg/m^3$ are produced and used mainly in the furniture industry and in the car industry, the reactive mixture being poured in moulds where it expands to fit the design of the mould.

Production of Unexpanded Products or Semi-Expanded Foam

Unexpanded final products are produced by simply casting the reactive mixture in a mould until the mould is completely filled.

Semi-expanded foam is produced by injecting the reactive mixture in the mould, where it expands to fit the design of the mould (RIM-RRIM Technology).

Polyurethane-based foams have been produced for a long time with the use, as expanding agents, of chlorofluorocarbons, known as CFCs, which cannot now be used since they are considered to be responsible for the hole in the ozone layer and hence to be ecologically harmful.

They have recently been replaced by hydrochlorofluorocarbons, known as HCFCs which, though soluble in polyurethane systems as CFCs are and thus suitable for preparing a base which is very stable over time and suitable for being expanded to create foam, continue to present ecological problems, although less significant than those of CFCs, so that their use will be limited within a few years and, eventually, will no longer be permitted.

There is therefore the problem of finding an expanding agent which is ecologically permissible and can replace the known HCFCs in the preparation of rigid polyurethane-based foams.

The product should have a cost no greater than the cost of HCFCs, which is already twice the cost of CFCs, and thus risks putting insulating polyurethane foams out of the market.

Research has been directed for some time towards the use of pentane (normal-pentane, iso-pentane, cyclopentane), nC5, iC5 cycloC5, respectively, and mixtures thereof, but these have the serious disadvantage of very poor solubility in the source products of polyurethane foam, both in polyols and in isocyanates, and of being inflammable.

However, since various ways of controlling inflammability are known, the true obstacle to the use of pentane as an expander for polyurethanes is its insolubility or, in any case, its insufficient solubility in the polyol component.

C5 is particularly attractive as a product for replacing chlorofluorocarbons in the manufacture of expanded polyurethane, above all because of its cost which is about half that of the known CFCs.

However, its insolubility continues to be a serious obstacle to its industrial use, since the emulsions used at present, which result from the mixing of pentane with polyols and isocyanates, are difficult to control and have a high degree of instability, tending to separate even in quite short periods.

This tendency causes serious problems in normal industrial processes such as those, for example, for the insulation of refrigeration equipment since, every time the plant is stopped, for example, at weekends or during quite long breaks in operation, the mixtures/emulsions separate and, when operation starts again, it is necessary to carry out lengthy and laborious resetting.

It is generally necessary to empty the entire plant completely, to re-emulsify the components, to restart the plant and to carry out once more all of the adjustments necessary to produce the desired product.

The substitution of pentane for the known HCFC products in the manufacture of expanded polyurethane has thus given rise to a large number of attempts to produce extremely fine and stable emulsions of pentane in the polyols and isocyanates from which polyurethane is produced so that, in practice, they have the same behaviour as HCFC solutions.

SUMMARY OF THE INVENTION

The object of the present patent is to produce a mixture of pentane in source products of polyurethane or polyisocyanurate foam (particularly in the polyol component) which is comparable to a solution rather than an emulsion and which is therefore stable almost indefinitely and has the same behaviour as HCFC-based solutions.

The ability to produce a product in solution also makes it possible to prepare a further emulsion without problems if it is necessary to introduce further quantities of C5.

According to the invention, this object is achieved by the association, with the pentane component, of a dialkanolamide derived from oily or fatty substances of vegetable origin, for example, groundnuts, flax, coconut and, particularly, soya.

The dialkanolamide generally constitutes at least 5% by weight of the polyol component, preferably 5% to 40% by weight and most preferably 8% to 30%.

Preferably, a diloweralkanolamide is used, wherein the term "lower alkanol" means a $C_{2-6}$ alkanol, and, most preferably a diethanolamide, like, for example, a product known as "soyamide dea", and identified by CAS Number 68425.47.8, which can be added to the formulation of the polyol component since it is soluble both in a large number of commonly-used polyols, and in pentane and can also be used as a base product for the formation of the foam.

This product will sometimes be referred to below as a vehicle.

Soyamide dea is derived from natural resources (soya) and can be used as an ecological alternative to products derived from petroleum.

The vehicle soyamide dea has the following characteristics:

free fatty acids, (%): 0.50 (m.w.=280)
amide, (%): 80.00 (minimum)
appearance at 25° C.: amber liquid
ionic activity: non-ionic surfactant
biodegradability: complete
colour (Gardner): 4–9
free diethanolamine (%): 4.6–9.5
glycerine (%): 5.00 max
pH (1% aqueous sol.): 8.5–9.5
flash point (° C.):>150 (Pensky Martens)

As stated, this is a diethanolamide from soya oil, also known as "Lincamid DSO", identified by CAS Number 68425.47.8.

It is generally used as a product for increasing viscosity, used in the formulations of shampoos, foam baths and detergents in general.

It can generally be stated that the introduction of a certain quantity of soyamide dea into the source system of polyurethane foam, for example, into the polyol component, enables an equal quantity of cycloC5 and half the quantity of nC5 or iC5 to be introduced easily for use as an expander; the effect is noted even with the use of minimal quantities.

The present invention also relates to a method of enhancing the solubility of a pentane within a starting mixture for the production of polyurethane foams, said mixture comprising a isocyanate component and a polyol component, that, in turn, comprises a pentane, which method includes the step of incorporating into said polyol component a dialkanolamide derived from oily or fatty substances of vegetable origin in an amount of at least 5% by weight of the weight of said polyol component.

Preferably said dialkanolamide is incorporated in a weight ratio of 1:1 to 1:2 with respect to the pentane and consists of a diethanolamide.

A particularly preferred diethanolamide is "Soyamide dea" CAS No. 68425.47.8

The pentane is selected from the group consisting of n-pentane, iso-pentane, cyclopentane and mixtures thereof.

DETAILED DESCRIPTION OF THE INVENTION

In order further to explain the features of the invention and its possible fields and methods of use, some embodiments thereof which, naturally, are non-limiting, are given below and relate to polyurethane formulations for various applications.

EXAMPLE 1

Formulation for insulating refrigerators/freezers with the use of cycloC5 as the expander and Arcol 3544 (1) from Arco Chemicals as the base polyol:

| | |
|---|---|
| ARCOL 3544 (1) | 80.00 parts (by weight) |
| SOYAMIDE DEA | 20.00 parts (by weight) |
| WATER | 1.00 parts (by weight) |
| TEGO 8404 (2) | 1.00 parts (by weight) |
| POLYCAT 8 (3) | 2.00 parts (by weight) |
| CYCLOC5 | 20.00 parts (by weight) |
| | 124.00 parts (by weight) |

The reference numerals in brackets beside certain components enable them to be identified in Table -A- at the end of the description.

The formulation given above gave rise to a mixture of products which was perfectly homogeneous and stable over time and which did not show phase separation as far as 0° C.

The viscosity of the mixture at 25° C. was 230 mPa/s and its specific weight at 25° C. was 0.995 g/ml.

Laboratory tests carried out with manual mixing of the components showed the following reaction characteristics:

| Crude MDI (index 105) = | 136.00 |
| --- | --- |
| Temperature = | 25° C. |
| Cream time = | 20" |
| Gel time = | 60" |
| Density with free expansion = | 23.9 kg/cu. m. |

The foam had the following characteristics:
Dimensional stability at 24 hours:
at +100° C.: mean linear variation+2.2%
at −20° C.: mean linear variation=−1.1%
Initial thermal conductivity at 23° C.=0.0269 W/m° C.

This formulation had at least the following advantages in comparison with the standard formulations with cyclopentane generally used for filling refrigerators:

the use of a smaller quantity of MDI (lower cost);
the use of a smaller quantity of water (less exothermy);
the use of large quantities of cyclopentane (better thermal conductivity value).

EXAMPLE 2

Formulation for insulating refrigerators/freezers with the use of nC5 as the expander and Voranol RN411 (4)from Dow Chemicals as the base polyol.

| VORANOL RN 411 (4) | 80.00 parts (by weight) |
| --- | --- |
| SOYAMIDE DEA | 20.00 parts (by weight) |
| WATER | 2.00 parts (by weight) |
| TEGO 8404 (2) | 1.00 parts (by weight) |
| POLYCAT 8 (3) | 2.00 parts (by weight) |
| nC5 | 10.00 parts (by weight) |
| | 115.00 parts (by weight) |

The reference numerals in brackets beside certain components enable them to be identified in Table -A- at the end of the description.

This mixture of products was perfectly homogeneous and stable and showed no phase separation as far as 0° C.

Viscosity at 25° C. was 420 mPa/s and the specific weight at 25° C. was 1.01 g/ml.

The reaction characteristics relating to laboratory tests with manual mixing of the components were as follows:

| Crude MDI (105 index) = | 136.00 |
| --- | --- |
| Temperature = | 25° C. |
| Cream time = | 14" |
| Gel time = | 52" |
| Density with free expansion = | 26.3 kg/cu. m. |

The characteristics of the foam were the following:
Dimensional stability at 24 hours:
at +100° C.: mean linear variation=+1.8%
at −20° C.: mean linear variation=−0.8%
Initial thermal conductivity at 23° C.=0.0267 W/m° C.
Note: In this case normal pentane, which is a cheaper product and is more difficult to mix, was used as the expander with very interesting results.

EXAMPLE 3

Formulation for continuous foaming of rigid expanded polyurethane for the production of insulating panels with the use of nC5 as the expander and Arcol 3750 (5) from Arco Chemicals as the base polyol.

| ARCOL 3750 (5) | 80.00 parts (by weight) |
| --- | --- |
| SOYAMIDE DEA | 20.00 parts (by weight) |
| WATER | 3.00 parts (by weight) |
| L 6900 (6) | 1.00 parts (by weight) |
| NIAX DMEA CATALYST (7) | 2.00 parts (by weight) |
| T.C.P.P. (8) | 30.00 parts (by weight) |
| nC5 | 10.00 parts (by weight) |
| | 146.00 parts (by weight) |

The reference numerals in brackets beside certain components enable them to be identified in Table -A- at the end of the description.

This mixture of products was perfectly homogeneous and stable and showed no phase separation as far as 10° C.

Viscosity at 25° C.=250 mPa/s
Specific weight at 25° C.=1.05 g/ml
Reaction characteristics relating to laboratory tests carried out with manual mixing of the components:
Crude MDI (120 index)=205.00
Temperature 25° C.
Cream time 12"
Gel time=35"
Density with free expansion=31.2 kg/cu.m.
Characteristics of the foam:
Dimensional stability at 24 hours
at +100° C.: mean linear variation=+2.2%
at 20° C.: mean linear variation=−0.8%
Reaction to fire (UNI 8457) Category II
Initial thermal conductivity at 23° C=0.0258 W/m° C.

EXAMPLE 4

Formulation for continuous foaming of rigid expanded polyurethane for the production of insulating panels with the use of nC5 as the expander and Caradol 530.03 (9) from Shell Chemicals as the base polyol.

| CARADOL 530.03 (9) | 80.00 parts (by weight) |
| --- | --- |
| SOYAMIDE DEA | 20.00 parts (by weight) |
| WATER | 3.00 parts (by weight) |
| L 6900 (6) | 1.00 parts (by weight) |
| NIAX DMEA CATALYST (7) | 2.00 parts (by weight) |
| T.C.P.P. (8) | 30.00 parts (by weight) |
| nC5 | 10.00 parts (by weight) |
| | 146.00 parts (by weight) |

The reference numerals in brackets beside certain components enable them to be identified in Table -A- at the end of the description.

This mixture of products was perfectly homogeneous and stable and showed no phase separation as far as 0° C.

Viscosity at 25° C.=200 mPa/s
Specific weight at 25° C.=1.04 g/ml
Reaction characteristics relating to laboratory tests carried out with manual mixing of the components:
Crude MDI (110 index)=182.00
Cream time=12"
Gel time=36"
Density with free expansion=28.4 kg/cu.m.

Characteristics of the foam
Dimensional stability
24 hours at 100° C.: mean linear variation=+2.1%
24 hours at −20° C.: mean linear variation=−0.7%
Reaction to fire (UNI 8457) Category II
Initial thermal conductivity at 23° C.=0.0269 W/m° C.

EXAMPLE 5

Formulation similar to the previous one but with a large quantity of nC5 as the expander.

| CARADOL 530.03 (9) | 60.00 parts (by weight) |
| --- | --- |
| SOYAMIDE DEA | 40.00 parts (by weight) |
| GLYCEROL | 10.00 parts (by weight) |
| WATER | 1.00 parts (by weight) |
| L 6900 (6) | 1.00 parts (by weight) |
| NIAX DMEA CATALYST (7) | 2.00 parts (by weight) |
| T.C.P.P. (8) | 30.00 parts (by weight) |
| nC5 | 20.00 parts (by weight) |
| | 164.00 parts (by weight) |

The reference numerals in brackets beside certain components enable them to be identified in Table -A- at the end of the description.

This mixture of products was perfectly homogeneous and stable and showed no phase separation as far as 10° C.

Viscosity at 25° C.=80 mPa/s.
Specific weight at 25° C.=0.985 g/ml.
Reaction characteristics relating to laboratory tests carried out with manual mixing of the components:
Crude MDI (115 index)=200.00
Cream time=15"
Gel time=39"
Density with free expansion=31.6 kg/cu.m.
Characteristics of the foam
Dimensional stability
24 hours at +100° C.: mean linear variation=+2.4%
24 hours at −20° C.: mean linear variation=−1.9%
Reaction to fire (UNI 8457) Category II
Thermal conductivity=0.0257 W/m°

EXAMPLE 6

Formulation for continuous production of rigid panels with improved fire reaction characteristics of the polyurethane foam based on nC5 and Ixol B 251 (10) polyol from Solvay & C.

| IXOL B 251 (10) | 60.00 parts (by weight) |
| --- | --- |
| SOYAMIDE DEA | 40.00 parts (by weight) |
| GLYCEROL | 10.00 parts (by weight) |
| WATER | 2.00 parts (by weight) |
| D.C. 193 (11) | 2.00 parts (by weight) |
| POLYCAT 8 | 2.00 parts (by weight) |
| T.C.P.P. (8) | 30.00 parts (by weight) |
| nC5 | 20.00 parts (by weight) |
| | 166.00 parts (by weight) |

The reference numerals in brackets beside certain components enable them to be identified in Table -A- at the end of the description.

This mixture of products was perfectly homogeneous and stable and showed no phase separation as far as 10° C.

Viscosity at 25° C.=170 mPa/s.
Specific weight at 25° C.=1.13 g/ml
Reaction characteristics relating to laboratory tests carried out with manual mixing of the components:
Crude MDI (110 index)=183.00
Temperature=25° C.
Cream time=16"
Gel time=40"
Density with free expansion=29.8 kg/cu.m.
Characteristics of the foam
Dimensional stability
24 hours at +100° C.: mean linear variation=+1.8%
24 hours at −20° C.: mean linear variation=−0.6%
Reaction to fire (UNI 8457) Category I
Reaction to fire (DIN 4102) CLASS B2
Initial thermal conductivity at 23° C.=0.0266 W/m° C.

EXAMPLE 7

Formulation for continuous production of rigid panels of polyisocyanurate foam with improved fire reaction characteristics, based on nC5 as the expander and Isoexter 3153 (12) polyester polyol from Coim Spa.

| ISOEXTER 3153 (12) | 50.00 parts (by weight) |
| --- | --- |
| SOYAMIDE DEA | 50.00 parts (by weight) |
| D.C. 193 (11) | 2.00 parts (by weight) |
| CATALYST | 5.00 parts (by weight) |
| T.C.P.P. (8) | 30.00 parts (by weight) |
| nC5 | 30.00 parts (by weight) |
| | 167.00 parts (by weight) |

The reference numerals in brackets beside certain components enable them to be identified in Table -A- at the end of the description.

This mixture of products separated into two phases with time but the compatibility of the nC5 in this polyester was greatly improved; gentle mixing of the components enabled optimal processability to be achieved.

Viscosity at 25° C.=90 mPa/s.
Specific weight at 25° C.=0.985 g/ml
Reaction characteristics relating to laboratory tests carried out with manual mixing of the components:
Crude MDI (300 index)=300.00
Temperature=25° C.
Cream time=15"
Gel time=48"
Density with free expansion=28.4 kg/cu.m.
Characteristics of the foam
Dimensional stability, 24 hours
at +100° C.: mean linear variation=+0.8%
at −20° C.: mean linear variation=−0.4%
Reaction to fire (UNI 8457) Category I
Reaction to fire (DIN 4102) CLASS B2
Initial thermal conductivity at 23° C.=0.0264 W/m° C.

EXAMPLE 8

Formulation for continuous production of rigid polyisocyanurate foam with improved fire reaction characteristics based on nC5 as the expander and Stepanpol 3152 (13) polyester polyol from Stepan Ltd.

| | |
|---|---|
| STEPANPOL 3152 (13) | 50.00 parts (by weight) |
| SOYAMIDE DEA | 50.00 parts (by weight) |
| DABCO D.C. 193 (11) | 2.00 parts (by weight) |
| CATALYST | 5.00 parts (by weight) |
| T.C.P.P. (8) | 30.00 parts (by weight) |
| nC5 | 30.00 parts (by weight) |
| | 167.00 parts (by weight) |

The reference numerals in brackets beside certain components enable them to be identified in Table -A- at the end of the description.

This mixture of products also separated with time but the compatibility of the nC5 in this polyester was increased so much that there were no problems with processability.

Viscosity at 25° C. 85 mPa/s.

Specific weight at 25° C.=0.990 g/ml

Reaction characteristics relating to laboratory tests carried out with manual mixing of the components:

Crude MDI (300 index)=288.00

Cream time=14"

Gel time=38"

Density with free expansion=28.9 kg/cu.m.

Characteristics of the foam

Dimensional stability 24 hours at 100° C.: mean linear variation=+1.5%

24 hours at −20° C.: mean linear variation=−1.0%

Reaction to fire (UNI 8457) Category I

Initial thermal conductivity at 23° C.=0.0259 W/m° C.

It can be stated that the use of soyamide dea in the production of polyisocyanurate foams blown with a pentane is of particular relevance.

In order to verify the process performance of new PIR systems based on soyamide dea on a real production apparatus, there was used a double band rolling mill 24 meters long, normally used for producing laminated panels of PUR with flexible facings, while keeping constant the conditions that are normally employed in PUR production.

EXAMPLE 9 (Comparative Example)

| Formulation | | Process conditions: |
|---|---|---|
| STEPANPOL PS 2352 (14) | 100.00 pbw | High Pressure Admiral Mach. |
| TCPP (8) | 30.00 pbw | Temp. ISOC. = 23° C. |
| WATER | 1.00 pbw | Temp. POL. = 23° C. |
| DABCO DC 5555 (15) | 3.00 pbw | Temp. Rolling Mill = 50° C. |
| NIAX DMEA CATAL. (7) | 2.00 pbw | Speed = 10 meters/minute |
| POLYCAT 46 (16) | 3.00 pbw | Thickness = 40 mm |
| n-PENTANE | 14.00 pbw | |
| | 153.00 pbw | |

The reference numerals in brackets beside certain components enable them to be identified in Table -A- at the end of the description.

MDI (300 index): 250.00 parts by weight

Density (core): 38 Kg/m³

Dimens. stability:

7 days at 70° C. and 90% R.H.: delta vol.=0.4–1.0%

7 days at −30° C.: delta vol.=−0.5 to −1.0%

Lambda (mean temp.=23° C.): initial 0.0230 W/m° K.

After 6 months at room temp.=0.0250 W/m° K

DIN 4102: B2 (cm 11 high flame)

Compressive Str. (parallel): 160 KPa

A density lower than 38 Kg/m³ cannot be achieved due to the poor solubility of pentane in the utilized polyester polyol and due to the impossibility of obtaining stable emulsions with more than 14 php of pentane.

With this formulation, which contains 1.0 part of water, adhesion is very critical and can only be improved by keeping the panels at 40° C. overnight.

Since water negatively affects the formation of the skin, it is not possible to increase the water content with the aim of obtaining a lower density, because the skin thus obtained would be too friable.

Moreover, the amount of pentane cannot be increased, owing to its poor solubility in the polyester polyol.

EXAMPLE 10

| Formulation: | | Process conditions: | |
|---|---|---|---|
| STEPANPOL PS 2352 (14) | 80.00 pbw | Temp. ISO. | 23° C. |
| SOYAMIDE DEA | 20.00 pbw | Temp. POL. | 23° C. |
| AMGARD V 490 (17) | 25.00 pbw | Roll mill temp. | 50° C. |
| DABCO DC 5555 (15) | 2.00 pbw | Speed | 10 m/min |
| NIAX DMEA CAT. (7) | 1.00 pbw | Thickness | nm 40 |
| POLYCAT 46 (16) | 2.00 pbw | | |
| n-PENTANE | 20.00 pbw | | |
| | 150.00 pbw | | |

| | |
|---|---|
| MDI (300 index) | 220.0 parts by weight |
| Density (core) | 35 Kg/m³ |
| Dimens. stability: | |
| 7 days at 70° C. and 90% R.H.: | delta vol. = 0.5–1.2% |
| 7 days at −30° C.: | deka vol. = −0.1 to −1.1% |
| Lambda (mean T° 23° C.) | initial = 0.0220 W/m° K. |
| | after 6 months at room |
| | T° = 0.0240 W/m° K. |
| DIN 4102 | B2 (cm 13.5 high flame) |
| Adhesion | good |
| Compression Str. (parallel) | 130 KPa |

It is to be remarked that elimination of water provides better lambda values.

No post-curing is needed, but the panels must be kept packed in a closed area at temperature not lower than 20° C. for 1 night before being handled.

In comparison with the formulation of Example 9, it can be remarked that the formulation of this Example, comprising a higher amount of pentane, thanks to the presence of soyamide dea, enables to obtain a foam with good adhesion properties and a lower density.

With this formulation it is possible to produce panels expanded with pentane, halogen free, B2 rating according to DIN 4102 fire test, with a thickness of 40 to 100 mm and with an initial lambda value of about 0.02 W/m° K.

EXAMPLE 11

| Formulation: | | Process conditions: | |
|---|---|---|---|
| STEPANPOL PS 2352 (14) | 60.0 pbw | Temp. ISO | 23° C. |
| SOYAMIDE DEA | 40.0 pbw | Temp. POL. | 23° C. |
| TCPP (8) | 40.0 pbw | Temp. roll.mill | 50° C. |
| DABCO DC 5555 (15) | 2.0 pbw | Speed: | 10 m/min |
| NIAX DMEA CAT. (7) | 2.0 pbw | Thickness | 40 mm |

-continued

| | |
|---|---|
| POLYCAT 46 (16) | 2.0 pbw |
| n-PENTANE | 26.0 pbw |
| | 172.0 pbw |

| | |
|---|---|
| MDI (index 300) | 250.00 parts by weight |
| Density (core) | 32 Kg/m³ |
| Dim. stability | 7 days at 70° C. 90% R.H. = 1.4–2.6% delta Vol. % |
| | 7 days at −30° C. = −0.8 to −1.1 delta Vol. % |
| Lambda | initial = 0.0230 W/m° K. |
| (mean T° = 23° C.) | after 6 months at room temp. = 0.0260 W/m° K. |
| DIN 4102 | B3 (cm 17 high flame) |
| Adhesion | very good |
| Compression Str. (parallel) | 120 KPa |

An additional trial run at 3 cm thickness showed that adhesion was still very good and that there were no critical process steps or conditions. The applicability of the process is greatly widened by using soyamide dea, which improves pentane solubility and surface adhesion, even at low temperature, making it easy to produce panels with very low thickness and low density and which do not need post curing.

The formulation of the present Example only enables to produce foams of the B3 kind, according to the German fire test DIN 4102, and not of the B2 kind, but is quite cheaper than the formulation of Example 10.

EXAMPLE 12

| | |
|---|---|
| CARADOL 530.03 (9) | 80.00 parts by weight |
| SOYAMIDE DEA | 20.00 parts by weight |
| WATER | 1.00 parts by weight |
| SIL.DC 5555 (15) | 1.00 parts by weight |
| NIAX DMEA CATALYST (7) | 3.00 parts by weight |
| TCPP (8) | 30.00 parts by weight |
| n-PENTANE | 10.00 parts by weight |
| HCFC 141b | 20.00 parts by weight |
| | 165.00 parts by weight |

The above formulation is suitable for the continuous foaming of rigid expanded polyurethane foams for the production of insulating panels. It gave rise to a mixture which was perfectly homogeneous and stable over time and which did not show any phase separation as far as 0° C.

The viscosity of the mixture thus obtained was 110 mPa/s at 25° C. and its specific weight at 25° C. was 1.090 g/ml.

Laboratory tests carried out with manual mixing of the components showed the following reaction characteristics:

| | |
|---|---|
| MDI (index 110) | 156.00 parts by weight |
| Temp. | 25° C. |
| Cream time | 15 sec. |
| Gel time | 40 sec. |
| Free rise density | 27.8 Kg/m³ |

As it can be seen from this Example, the increase of solubility of the pentane in a completely formulated polyol component also occurs when pentane is combined with other auxiliary blowing agents, such as HCFC's and HFC's.

EXAMPLE 13

| | |
|---|---|
| CARADOL 530.03 (9) | 80.00 parts by weight |
| SOYAMIDE DEA | 20.00 parts by weight |
| WATER | 1.00 parts by weight |
| SIL.DC 5555 (15) | 1.00 parts by weight |
| NIAX DMEA CAT. (7) | 3.00 parts by weight |
| TCPP (8) | 30.00 parts by weight |
| n-PENTANE | 10.00 parts by weight |
| HFC 245 fa | 10.00 parts by weight |
| | 155.00 parts by weight |

The above formulation is suitable for the continuous foaming of rigid expanded polyurethane foams for the production of insulating panels.

It gave rise to a mixture which was perfectly homogeneous and stable over time and which did not show any phase separation as far as 0° C.

The viscosity of the mixture thus obtained was 130 mPa/s at 25° C. and its specific weight at 25° C. was 1.070 g/ml.

Laboratory tests carried out with manual mixing of the components showed the following reaction characteristics:

| | |
|---|---|
| MDI (index 110) | 156.00 parts by weight |
| Temp. | 25° C. |
| Cream time | 12 sec. |
| Gel time | 38 sec. |
| Free rise density | 30.2 Kg/m³ |

EXAMPLE 14

| | |
|---|---|
| VORANOL CP 4711 (18) | 100.00 parts by weight |
| MONOETHYLENGLYCOL | 5.00 parts by weight |
| NIAX DMEA CATALYST (7) | 1.00 parts by weight |
| DABCO 33 LV (19) | 1.00 parts by weight |
| SOYAMIDE DEA | 10.00 parts by weight |
| n-PENTANE | 10.00 parts by weight |
| | 127.00 parts by weight |

The above formulation gave rise to a mixture which was perfectly homogeneous and stable over time and which did not show any phase separation as far as 0° C.

The viscosity of the mixture thus obtained was 230 mPa/s at 25° C. and its specific weight at 25° C. was 0.970 g/ml.

Laboratory tests carried out with manual mixing of the components showed the following reaction characteristics:

| | |
|---|---|
| ISONATE M 143 (20) (index 110) | 50.80 parts by weight |
| Temp. | 25° C. |
| Cream time | 12 sec. |
| Gel time | 40 sec. |
| Free rise density | 63.9 Kg/m³ |

This formulation is suitable for foaming semi-flexible polyurethane foam for the production of cushions, arm-rests, saddles and the like.

On the basis of the results given above and also of the results of further analyses, it could be concluded that all of the characteristics of the foams obtained were comparable with those obtained with the use of systems expanded with HCFC's.

Rigid and flexible expanded polyurethane has for years been produced with the use, as the polyol component, of a mixture of products also containing the blowing agent (first CFC's, now HCFC's and HFC's). At the moment, owing to ecological problems, the systems most often used in Europe for the insulation of refrigerators, refrigerated counters and continuous panels use pentane (normal-, iso- and cyclopentane and mixtures thereof) as an expander which causes great problems with the mixing of the polyol component and with processability.

Dialkanolamides such as diethanolamide from soya oil considerably increase the solubility of pentanes in the polyol component, permitting the production of completely homogeneous systems which are easy to process with good final characteristics of the expanded product.

TABLE -A-

(1) Arcol 3544: Arco Chemicals polyether polyol.
(2) Tegostab B 8404: Th. Goldschmidt silicone surfactant.
(3) Polycat 8 : Air Products catalyst.
(4) Voranol RN 411: Dow Chemicals polyether polyol.
(5) Arcol 3750 : Arco Chemical polyether polyol.
(6) Surfactant L 6900 : Osi Specialties silicone surfactant.
(7) Niax DMEA Catalyst: Osi Specialties catalyst.
(8) T.C.P.P.: Courtaulds Chemicals flame retardant.
(9) Caradol 530.03 : Shell Chemicals polyether polyol.
(10) Ixol B 251: Solvay & Cie polyether polyol.
(11) Dabco DC 193: Air products silicone surfactant.
(12) Isoexter 3153: Coim Spa polyester polyol.
(13) Stepanpol 3152: Stepan Company polyester polyol.
(14) Stepanpol PS 2352: Stepan Company Polyester polyol
(15) Dabco DC 5555: Air Products Silicone surfactant
(16) Polycat 46: Air Product catalyst
(17) Amgard V 490: Albright & Wilson Flame retardant
(18) Voranol CP 4711: Dow Chemical Polyether polyol
(19) Dabco 33 lv: Air Products catalyst
(20) Isonate M 143: Dow Chemical Isocyanate

I claim:

1. A polyurethane or polyisocyanurate foam derived from a mixture comprising a crude isocyanate component and a polyol component which contains all or some of the following products in a homogeneous mixture: polyols, catalysts, surfactants, water, flame-retardants, fillers, dyes, pigments, expanding agents and a compatibilizing agent for the expanding agents, wherein said expanding agents comprise of a pentane component and said compatibilizing agent is a dialkanolamide derived from oily or fatty substances of vegetable origin and is present in an amount of at least 5% by weight of the weight of said polyol component, wherein the solubility of the pentane in the polyol component is enhanced due to the presence of the dialkanolamide.

2. A foam according to claim 1, wherein said polyol component contains 5% to 40% by weight of said dialkanolamide.

3. A foam according to claim 1, wherein said substances of vegetable origin are soya oil.

4. A foam according to claim 1, wherein said substances of vegetable origin are selected from the following: ground nuts, flax, coconut.

5. A foam according to claim 1, wherein said pentane component is selected among the group consisting of n-pentane, iso-pentane, cyclopentane, and mixtures thereof.

6. A foam according to claim 5, wherein said pentane component is cyclopentane.

7. A foam according to claim 1, wherein said dialkanolamide is a diloweralkanolamide.

8. A foam according to claim 7, wherein said diloweralkanolamide is diethanolamide.

9. A foam according to claim 8, wherein said diethanolamide has the following characteristics:

free fatty acids, (%): 0.50 (m.w.=280)
amide, (%): 80.00 (minimum)
appearance at 25° C.: amber liquid
ionic activity: non-ionic surfactant
biodegradability: complete
colour (Gardner): 4–9
free diethanolamine (%): 4.6–9.5
glycerine (%): 5.00 max
pH (1% aqueous sol.): 8.5–9.5
flash point (° C.):>150 (Pensky Martens).

10. A foam according to claim 1, which contains from 1.5 to 15 parts by weight, preferably 1.5 to 8 parts by weight, of polyols per part of pentane component.

11. A foam according to claim 8, which contains from 1 to 2 parts by weight of diethanolamide per part of pentane component.

12. A foam according to claim 8, wherein said diethanolamide is a dialkanolamide derived from soya oil.

* * * * *

UNITED STATES PATENT AND TRADEMARK OFFICE
CERTIFICATE OF CORRECTION

PATENT NO. : 5,910,515
DATED : June 8, 1999
INVENTOR(S) : Claudio CHITTOILNI

It is certified that error appears in the above-identified patent and that said Letters Patent is hereby corrected as shown below:

Claim 1, column 14, line 2, delete "of".

Signed and Sealed this

Second Day of May, 2000

Attest:

Q. TODD DICKINSON

*Attesting Officer*    *Director of Patents and Trademarks*